April 7, 1970 R. D. COLLINS ET AL 3,504,702
FLUID MIXING DEVICE
Filed Oct. 24, 1968 2 Sheets-Sheet 1
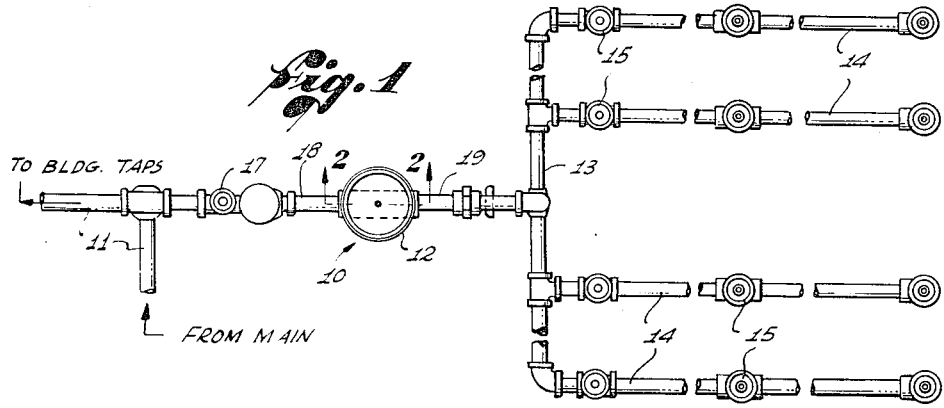
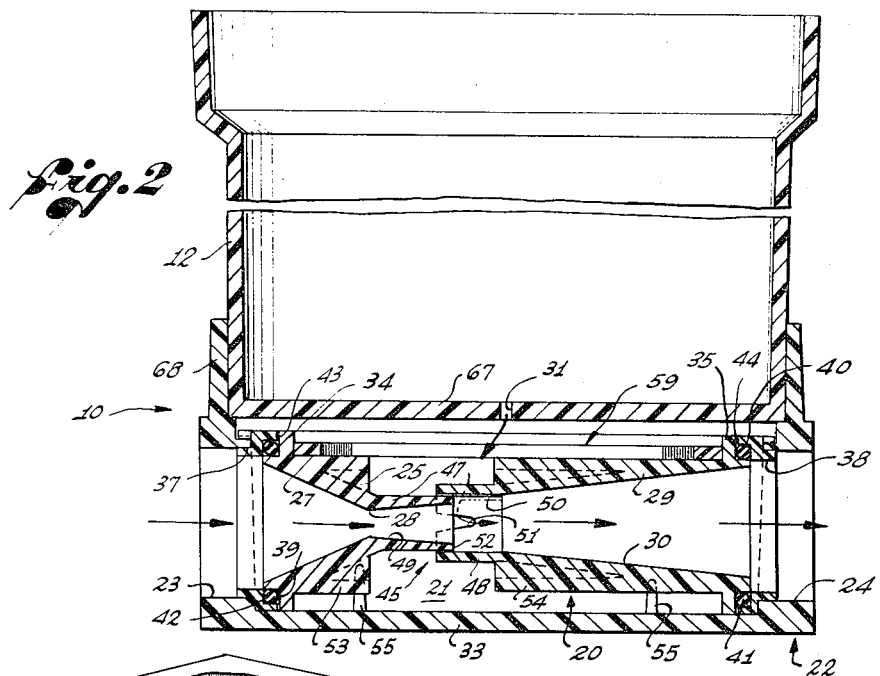
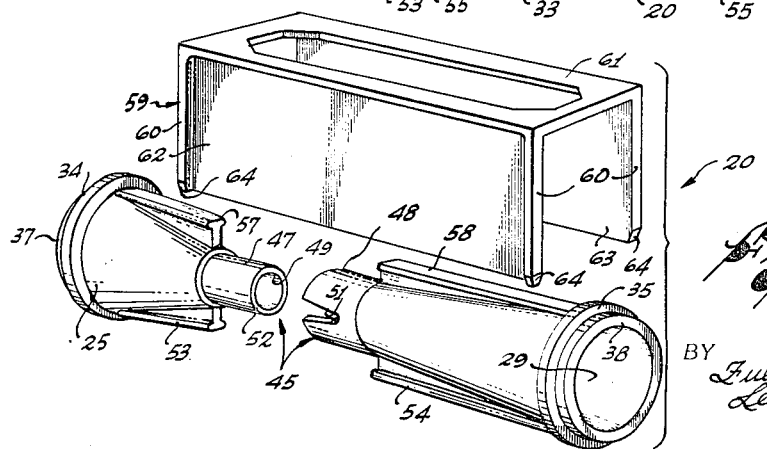
INVENTORS
RALPH D. COLLINS
DON C. WILLIS
BY Fulwider, Patton, Rieber, Lee, and Utecht
ATTORNEYS April 7, 1970   R. D. COLLINS ETAL   3,504,702
FLUID MIXING DEVICE
Filed Oct. 24, 1968   2 Sheets-Sheet 2
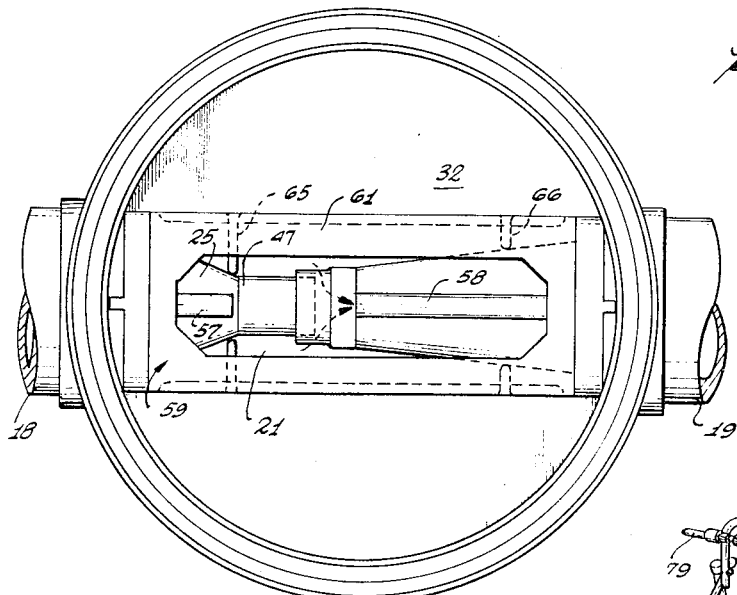
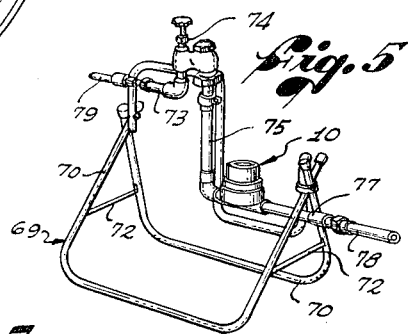
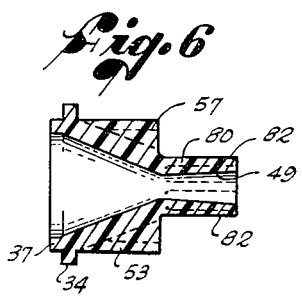
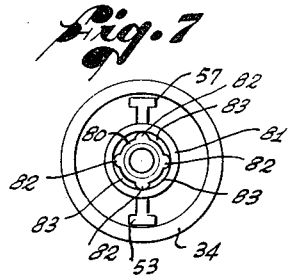
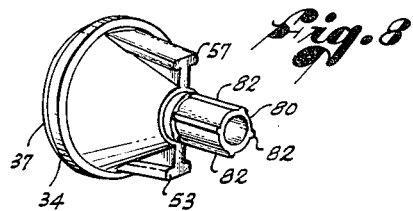
INVENTOR.
RALPH D. COLLINS
DON C. WILLIS
BY
Fulwider, Patton, Rieber
Lee, and Utecht
ATTORNEYS United States Patent Office 3,504,702
Patented Apr. 7, 1970

3,504,702
FLUID MIXING DEVICE
Ralph D. Collins, Beverly Hills, and Don C. Willis, Marina Del Rey, Calif., assignors to Spec, Inc., Beverly Hills, Calif., a corporation of California
Continuation-in-part of application Ser. No. 564,059, July 11, 1966. This application Oct. 24, 1968, Ser. No. 770,155
Int. Cl. B01f 5/04; B05b 7/30
U.S. Cl. 137—604                    19 Claims

ABSTRACT OF THE DISCLOSURE

A device for mixing water with a soil-conditioning fluid and having a base with a circular reservoir-mounting flange upstanding from a wall having an opening forming the upper side of an elongated sump recess, the recess being formed with inlet and outlet openings in its opposite ends. A reservoir is disposed above the base and held by the mounting flange, and a venturi-type mixing unit is disposed in the sump recess with conical inlet and outlet sections of the unit seated against the respective openings and connected by a telescoping tubular joint. A retainer overlying the mixing unit has wedge elements for extending the ends of the venturi sections into seats around the inlet and outlet openings, and ports are formed in the connecting joint for the entry of soil-conditioning fluid from the reservoir into the water flowing through the unit. One using system is a permanent sprinkler system, and an alternative has a portable stand for connection to hoses.

CROSS-REFERENCE TO RELATED APPLICATION

This application is a continuation-in-part of copending application Ser. No. 564,059, filed July 11, 1966, now abandoned, and entitled Soil Conditioning Device.

BACKGROUND OF THE INVENTION

This invention relates to a device for mixing two fluids, for example, water and a soil conditioning fluid such as a liquid insecticide, pesticide, fertilizer, or other stimulant for plant growth, and has particular reference to a mixing device in which one fluid is passed through a venturi-type mixing unit to create suction for drawing a second fluid out of a reservoir and into the outlet portion of the unit, the characteristics of the venturi unit determining the mixing ratio.

Various fluid mixing devices of this general type are known, but have been found to be expensive, complicated, hard to handle and difficult to adjust and control for different flow rates and mixing ratios. Moreover, the operation of many conventional units often is unsatisfactory or unreliable when ratio adjustments are required.

SUMMARY OF THE INVENTION

The general object of the present invention is to provide an economical and simply constructed mixing device with which the mixing ratio is easily variable and in which the flow characteristics after adjustment are maintained at the optimum condition for the particular fluids involved. More specifically, the preferred form of the invention utilizes a mixing unit of the venturi type that is easily inserted in and removed from a sump recess in the base of the device for quick interchangeability of the parts, the unit being formed in separable parts permitting easy adjustment of the mixing ratio by changing the inlet section, the orifice size, or the flow area of the passage for adding one fluid to the other fluid flowing through the venturi.

In addition, the invention resides in the telescoped joinder of the sections for movement of each into sealed relation with the ends of the sump recess, the novel manner of positioning and sealing the sections in the recess while retaining the easy removability of the unit, the novel manner of admitting fluid into the unit at the selected rate through the telescoped joint between the sections, and the configuration of the fluid reservoir which also serves as a cover when the device is not in use.

Other objects and advantages of the present invention will become apparent from the following detailed description, taken in conjunction with the accompanying drawings.

BRIEF DESCRIPTION OF THE DRAWINGS

FIGURE 1 is a fragmentary plan view of a system equipped with a mixing device embodying the novel features of the present invention.

FIG. 2 is an enlarged fragmentary cross-sectional view taken in a vertical plane through the mixing device, substantially along the line 2—2 of FIG. 1.

FIG. 3 is an enlarged, exploded perspective view of the mixing unit and its retainer.

FIG. 4 is a fragmentary plan view of the device in FIG. 2 with the cover removed.

FIG. 5 is a perspective view of the device incorporated in a portable mounting stand.

FIG. 6 is a partial cross-section showing a modified form of the inlet section of the mixing unit.

FIG. 7 is a cross-section taken through the mixing unit with the modified inlet section in place relative to the outlet section.

FIG. 8 is a perspective view of the modified inlet section.

DETAILED DESCRIPTION

As shown in the drawings for purposes of illustration, the invention is embodied in a device 10 for mixing water from a supply pipe 11 with liquid fertilizer, insecticide, or pesticide from a reservoir 12 on the device, and delivering the mixture for use by a sprinkling system comprising a feed pipe 13 and a plurality of branches 14 servicing sprinkler heads 15. A valve 17 controls the flow of water from the supply line 11 through sections 18 and 19 of pipe on opposite sides of the mixing device and thence to the sprinkler system.

Incorporated in the mixing device 10 is a mixing unit 20 of the venturi type which is fitted in a sump recess 21 in a housing or base 22 of the mixing device, the base having inlet and outlet openings 23 and 24 at the opposite ends of the sump for connection to the pipe sections 18 and 19. As will be seen in FIGS. 2 and 3, the mixing unit comprises an inlet section 25 adjacent the inlet opening 23 and defining an inlet passage 27 tapering downstream to an orifice 28, and an outlet section 29 extending from the inlet section to the outlet opening 24, the outlet section defining an outlet passage 30 of increasing area so that a first fluid passing through the unit is constricted at the orifice 28 to produce suction in the low-pressure portion of the venturi.

The reservoir 12 herein is disposed above the base 22 and delivers the second fluid to the sump 21 for mixing into the flow of first fluid passing through the unit, at least one suitable opening 31 being provided for the entry of the second fluid into the sump, and thus to the venturi, as a result of the suction. Then the two fluids are mixed thoroughly in passing out of the unit through the outlet passage 29, and through the pipes 19, 13 and 14, and the mixture finally is sprayed by the heads 15 over the area to be covered. It should be understood that the manner of usage and the details of the using system are only incidental to the present invention, which resides in the mixing device 20 rather than the system as a whole.

In accordance with an important aspect of the invention, the base 22 is formed with the sump 21 recessed in one wall 32 (FIG. 4) thereof, beneath the reservoir 12, and the mixing unit 20 is readily insertible in and removable from the sump through the open side thereof facing toward the reservoir, the upper side as shown herein. This permits easy access to the mixing unit for servicing and, more importantly, for removal of one unit and insertion of another so as to change the mixing characteristics such as the inlet cone angle and the size of the orifice 28.

As shown most clearly in FIGS. 2 and 4, the sump 21 is of box-like shape having upright end walls defining the inlet and outlet openings 23 and 24, and preferably is rectangular in vertical cross-section, as defined by elongated sides extending downwardly from the base wall 32, and a horizontal bottom wall 33 beneath the sump. The open upper side of the sump is long enough to receive the mixing unit freely from above when the reservoir is removed.

Moreover, the end walls of the sump 21 are formed with surfaces for sealing against the ends of the mixing unit 20, so as to prevent fluid from passing around either end of the unit into or out of the passages 27 and 30. Herein, each section 25, 29 of the unit has a radial flange 34, 35 encircling its larger end and a longitudinally extending flange 37, 38 constituting its larger end, and the end walls of the sump have circular seats 39, 40 therein for receiving the longitudinal flanges with sealed fits, herein with O rings 41, 42 (FIG. 2) encircling the flanges inside the seats to complete the seals. The radial flanges 34, 35 are pressed snugly against the opposed circular edges 43, 44 encircling the seats.

It will be seen that the total length of the mixing units 20, when installed as shown in FIG. 2, is slightly greater than the spacing of the oppose seat edges 43, 44. To permit insertion of the mixing unit, the two sections 25 and 29 are connected by a telescoping, longitudinally contractible joint, indicated generally at 45 and herein formed by telescoping tubular necks 47 and 48 on the adjacent ends of the two sections. The neck 47 on the inlet section 25 extends downstream from the orifice 28 and has a gradually increasing internal cross-sectional area at 49, and the neck 48 on the outlet section 29 telescopes over the inlet neck 47 and defines a cylindrical portion 50 in the venturi leading to the flaring outlet passage 30. Thus, the inlet neck may be pushed into the outlet neck 48 with a close sliding fit far enough to permit insertion of the unit between the opposed seat edges 43 and 44, and then slides out to extend both ends of the unit into the respective seats 39 and 40.

Advantage is taken of the construction of this telescoping joint 45 to provide a novel inlet port for fluid from the sump 21 to enter the mixing unit 20 at a selected mixing rate for a given primary flow rate. As shown in FIGS. 2 and 3, elongated slots 51 are formed in opposite sides of the outlet neck 48 so as to extend beyond the telescoped end 52 of the inlet neck 47, when assembled, and leave a preselected flow area uncovered by the inlet neck for entry of the fluid from the sump 21 into the portion 50 of the venturi passage.

Thus, in order to change the amount of sump fluid mixed with the water, an inlet section 25 with a different length of neck (or an outlet section with a different slot area) is substituted for the section shown. In addition, the inlet section may be replaced with another inlet section having a different cone angle an orifice size, as well. In these ways, it is possible to tailor the venturi to the particular fluids and desired mixing ratios with a relatively simple substitution of parts. The sections 25 and 29 may be made of any suitable material, preferably being simple plastic moldings which can be provided in sets providing a range of venturi characteristics.

The angular position of the mixing sections 25 and 29 is maintained in the sump 21 by cooperating positioning elements on the sections and on the bottom wall 33 of the sump. As shown in FIGS. 2 and 3, each section has a longitudinal rib 53, 54, herein of inverted, generally T-shaped cross-section, formed on its underside to fit into an upwardly opening groove in the bottom wall, the grooves being formed between laterally spaced posts 55 integral with and upstanding from the bottom wall. Similar longitudinal rubs 57, 58 are formed on the opposite side of each venturi section so that the latter may be inserted if turned one hundred and eighty degrees, the second set of ribs also forming grips or handles projecting upwardly from the assembled mixing unit to facilitate the grasping of the sections during insertion and removal. It will be seen that all four ribs have outer sides that are parallel to the axes of the sections and are spaced radially inwardly from the sealing and positioning flanges 34 and 35.

To press each section 25, 29 firmly into the associated seats 39 and 40 while pressing the radial flanges 34 and 35 ends in sealed relation, a retainer 59 (FIGS 2–4) is pressed over the mixing unit 20 after the latter has been placed in the sump 21, and is formed with wedge elements 60 fitting between the opposed sides of the flanges 34 and 35 and operating to urge the sections apart as an incident to insertion of the retainer in the sump. Herein, the retainer is a cage-like plastic molding having a slotted top wall 61 and depending sidewalls 62 and 63 formed with thickened end edges 60 having beveled lower ends 64 constituting the wedging elements which fit inside the flanges 34 and 35 in the axially contracted condition of the unit 20.

In addition, the retainer has interrupted transverse webs 65 and 66 for straddling the inlet section 25 and the outlet section 29 for proper lateral positioning of the unit in the sump 21. As the retainer 59 is pressed down into the sump and over the unit 20, the depending sidewalls 62 and 63 fit into the sump on opposite sides of the mixing unit while the webs 65 and 66 straddle the unit, and the inclined end edges 64 wedge between the flanges 34 and 35 and extend the sections 25 and 38 snugly into the seats 39 and 40 while pressing the radial flanges 34 and 35 against the edges 43 and 44.

The resilience of the plastic of the edges 60 on the retainer 59 accommodates a slight stressing of the sidewalls 62 and 63 during insertion, and the edges thus continue to exert resilient sealing pressure upon the mixing sections in service use. The slotted top wall 61 not only admits fluid from the reservoir 12 through the retainer 59 into the sump 21, but also facilitates the gripping and removal of the retainer for access to the mixing unit 20. It should be noted that this wedged extension and positioning of the mixing sections 25 and 29 insures that the proper amount of each slot 51 will be open for the flow of liquid from the sump into the outlet passage 50, 30.

Another feature of the device 10 is the construction of the reservoir 12, which is designed to double as a cover when the device is not in use. As shown in FIGS 1 and 2, the reservoir herein is a cup-shaped container having an open upper end and a bottom wall 67 formed with a small opening 31 through which fluid from the interior of the container flows to the sump recess 21 to be sucked into the mixing unit 20. Formed on the base 22 of the mixing unit is an upstanding flange 68 in which the container is received with a close fit in the upright position shown in FIG. 2. Herein, both the container 12 and the mounting flange 68 are cylindrical.

The open upper end of the container 12 is of the same shape as the mounting flange 68 and is sized to telescope snugly with the flange, herein outside the latter, when the container is inverted to serve as a cover, as illustrated in FIG. 5. Thus, the container protects the interior of the device from exposure to the elements and from the entry of foreign matter which could result in clogging of parts of the system when operation of the mixing device is resumed.

An alternative mounting for the mixing device 10 is shown in FIG. 5 to make it clear that the invention is not limited to a stationary system as shown in FIG. 1. In this embodiment, the device 10 is mounted on a stand 69 formed with U-shaped tubular legs 70 pivotally connected at 71 and braced at 72. The stand supports an inlet pipe 73 leading to a control valve 74 through which water is directed to pipes 75 and 77 leading into and out of the mixing device 10, the outlet pipe 77 having a fitting connectible to a sprinkler hose 78. Another hose 79 can be used to deliver water to the inlet pipe 73. The mixing device itself may be identical to that in FIGS. 1–4.

Parts of an alternative form of the mixing unit are shown in FIGS. 6–8, the difference in this form being in the manner of admitting fluid from the sump 21 into the mixing unit. Instead of a slot in the telescoping outlet neck 48, as shown in FIGS. 2 and 3, this form has loosely telescoping necks 80 and 81 (FIG. 7) held in radially spaced relation by elongated ribs 82 formed on one of the necks and fitting closely against the other to leave inlet ports or passages extending between the necks, longitudinally thereof as shown at 83 in FIG. 7. Herein, there are four such ribs, which are formed on the outer side of the inlet neck 80. Of course, the total flow area between the ribs is selected for the mixing ratio desired, and may be changed by substituting an inlet section with different sizes of gaps between the ribs, for a different total flow area. Thus, the ribs 82, the outside of the inner neck 80, and the inside of the outer neck 81 define the longitudinal flow passages 83 within the telescoped joint for a controlled flow of fluid from the sump 21 to the outlet passage. All other parts may be the same as in FIGS 1–4, and are indicated by the same reference numbers.

From the foregoing, it will be seen that the present invention provides a mixing device 10 that is of relatively simple and economical construction and is highly versatile in operation, providing for ready and accurate adjustment of the venturi characteristics without excessive manipulation, guesswork, danger of clogging or malfunction as a result of the adjustment. Moreover, the unit very effectively mixes as well as meters the liquid being added to the main flow through the sump 21. It also will be evident that while a particular form of the invention has been illustrated and described, and a specific use has been suggested, various modifications and other uses can be made without departing from the spirit and scope of the invention.

We claim as our invention:

1. A device for mixing two fluids, said device comprising:
   a base having a wall adapted to be disposed in an upwardly facing position, a circular flange upstanding from said wall, and an elongated opening in said wall;
   an elongated sump disposed beneath said opening and having inlet and outlet openings formed in its opposite ends for a flow of a first liquid through said sump;
   a mixing unit disposed in said sump and having a conical inlet section with a larger end abutting against the end of said sump defining said inlet opening, a conical outlet section with a larger end abutting against the other end of said sump, and a telescoping joint joining the smaller ends of said sections together between the ends of said sump, said sections defining a venturi passage through said unit for said first fluid and having at least one inlet port communicating between said passage and the sump;
   a reservoir container removably mounted on said base above said wall and retained on said base by said flange, said container having a bottom wall and an opening for admitting a second fluid to said sump; and means holding the larger ends of said sections in sealed relation with the ends of said sump, said sections being insertible in and removable from said sump through said open side when said container is removed.

2. A mixing device as defined in claim 1 in which said sump ends are formed with seats for receiving the larger ends of said sections with snug fits, said sections being insertible in said sump in telescoped and contracted condition and then extended into said seats.

3. A mixing device as defined in claim 2 in which said holding means comprises a retainer disposed in said sump in overlying relation with said mixing unit and having wedge elements thereon for extending said larger ends into said seats as an incident to insertion of the retainer into said sump.

4. A device for mixing two fluids, said device comprising:
   a base having a sump formed with inlet and outlet openings in the opposite ends of said sump for a flow of a first fluid through said sump and also having an open side between said ends;
   a mixing unit disposed in said sump and sized and shaped for insertion and removal through said open side, said mixing unit including
   an inlet section defining an inlet passage tapering from said inlet opening toward said outlet opening and terminating between said ends in an orifice of preselected size.
   an outlet section extending from beyond said orifice to said outlet opening and defining an outlet passage of increasing diameter beyond said orifice,
   means on said unit for admitting fluid from said sump into said outlet passage,
   and a means releasably connecting said sections together while permitting endwise movement of each said sections toward the adjacent end of said sump;
   said sections and said sump ends having opposed sealing surfaces thereon;
   a retainer insertible in said sump through said open side in overlying relation with said sections, and having means thereon for holding each of said sections in abutting engagement with said ends;
   and means on said base for supporting a reservoir of fluid and delivering the same to said sump.

5. A mixing device as defined in claim 4 in which said connecting means comprise telescoping coaxial necks on said sections.

6. A mixing device as defined in claim 5 in which said means for admitting fluid from said sump to said outlet passage includes at least one longitudinal slot in one of said necks partially covered by the other neck to leave an entry opening of preselected area when said sections are held against said ends.

7. A mixing device as defined in claim 5 in which said retainer has wedge elements for spreading said sections away from each other and urging the sections toward said ends.

8. A mixing device as defined in claim 7 in which said sections are formed with axially spaced, opposed surfaces facing toward each other, and said retainer elements are spring fingers movable between said surfaces and shaped to wedge the latter apart and shift said sections into sealing engagement with said ends.

9. A mixing device as defined in claim 5 in which one of said necks if formed with spacing means thereon holding the telescoping surfaces of the necks in radially spaced relation, thereby to form said fluid-admitting means around the inner of the necks.

10. A mixing device as defined in claim 9 in which said spacing means are longitudinal ribs angularly spaced around said inner neck to define a plurality of fluid-admitting passages of preselected flow area.

11. A mixing device as defined in claim 4 in which said supporting means include a flange of preselected shape upstanding from said base, said device including a reservoir formed with a bottom having said preselected shape overlying said open side of said sump and telescoped with said flange.

12. A device for mixing two fluids said device comprising:
   a housing having an elongated sump recess formed with inlet and outlet openings at the opposite ends of the recess and with an elongated open side extending between said ends;
   a mixing unit disposed in said sump recess and sized and shaped for insertion and removal through said elongated open side, the interior of said mixing unit defining a mixing passage for a first fluid and having an inlet section communicating with said inlet opening and an outlet section communicating with said outlet opening, and said sections being joined together between said ends and defining an orifice of preselected reduced size whereby a flow of said first fluid through said passage produces a pressure drop beyond said orifice;
   a reservoir for a second fluid covering said open side of said sump recess and having means thereon for delivering the fluid to the sump recess around said mixing unit, said housing having means thereon for supporting said reservoir removably in place;
   said mixing unit having at least one port communicating with said passage beyond said orifice to deliver said second fluid to said first fluid for mixing in said outlet section and discharge through said outlet opening;
   and opposed surfaces on the ends of said mixing unit and said ends of said sump recess for sealing said inlet and outlet sections around said inlet and outlet openings upon insertion of the mixing unit in said recess through said open side and also permitting removal of the mixing unit through said open side when said reservoir is removed.

13. A mixing device as defined in claim 12 in which said inlet section is a first conical unit tapering to said orifice, and replaceable by additional conical units having different inlet configurations and orifices of different sizes for insertion in said sump recess at said inlet openings to provide for mixing of said fluids in different ratios.

14. A mixing device as defined in claim 12 in which said mixing unit has a longitudinal web on one side, and said sump recess has a bottom wall formed with positioning means thereon opening toward said open side of the sump recess to receive said longitudinal web and hold the unit in a fixed angular position within the sump recess.

15. A mixing device as defined in claim 12 in which said housing includes an upstanding flange defining a seat for receiving said reservoir, and the latter is a cup having a bottom that fits within said flange, said bottom having an opening constituting the means for delivering fluid to said sump recess.

16. A mixing device as defined in claim 15 in which said cup has an open end opposite said bottom that is sized and shaped to telescope with said flange when the cup is inverted, thereby forming a cover for the housing.

17. A mixing device as defined in claim 12 in which said mixing unit is formed with a handle on the side adjacent said open side of said sump recess for lifting the unit out of the recess.

18. A mixing device as defined in claim 12 in which said mixing unit comprises separable inlet and outlet sections releasably joined together adjacent said orifice.

19. A mixing device as defined in claim 18 in which said separable sections are telescopingly joined together at a tubular neck beyond said orifice, and further including a retainer insertible through said open side of said recess after said sections are in place and operable to spread the sections longitudinally and seal the ends thereof tightly against the ends of said recess.

References Cited

UNITED STATES PATENTS

| 2,293,390 | 8/1942 | Hengesbach | 239—318 |
| 2,608,801 | 9/1952 | Ridley. | |
| 2,724,583 | 11/1955 | Targosh et al. | 239—318 XR |
| 2,948,233 | 8/1960 | Scharfe | 103—262 |
| 3,260,464 | 7/1966 | Harant | 239—318 |

ROBERT G. NILSON, Primary Examiner

U.S. Cl. X.R.

239—318